United States Patent
Gerber (12)

(10) Patent No.: US 6,174,169 B1
(45) Date of Patent: Jan. 16, 2001

(54) LASER IDENTIFICATION SYSTEM

(75) Inventor: Peter Gerber, Berikon (CH)

(73) Assignee: Oerlikon Contraves AG, Zurich (CH)

(*) Notice: Under 35 U.S.C. 154(b), the term of this patent shall be extended for 0 days.

(21) Appl. No.: 09/019,424

(22) Filed: Feb. 5, 1998

Related U.S. Application Data

(60) Provisional application No. 60/038,051, filed on Feb. 18, 1997.

(30) Foreign Application Priority Data

Nov. 27, 1997 (EP) .................................. 97120818

(51) Int. Cl.⁷ .............................. F41A 33/00; F41G 3/26
(52) U.S. Cl. ................................ 434/11; 434/19; 434/21; 434/22
(58) Field of Search ..................... 434/22, 11, 16, 434/21, 19; 455/39, 73; 372/9

(56) References Cited

U.S. PATENT DOCUMENTS

| | | | |
|---|---|---|---|
| 4,361,911 | * 11/1982 | Buser et al. ................ | 359/169 |
| 4,983,021 | 1/1991 | Fergason . | |
| 5,142,288 | * 8/1992 | Cleveland ................ | 342/45 |
| 5,788,500 | * 8/1998 | Gerber ................ | 434/22 |

FOREIGN PATENT DOCUMENTS

| | | |
|---|---|---|
| 2215463 | 10/1973 | (DE) . |
| 4003960 | 8/1990 | (DE) . |
| 0187086 | 3/1989 | (EP) . |

* cited by examiner

*Primary Examiner*—John Edmund Rovnak
(74) *Attorney, Agent, or Firm*—Townsend and Townsend and Crew LLP; Guy W. Chambers, Esq.

(57) ABSTRACT

A soldier carries a weapon on which a laser device (1) is mounted, which is used for illuminating a harness device (6) on the body of another soldier. This harness device is provided with sensors (61, 62, 63, . . . ), which perform detection tasks for several applications in connection with arbitrary simulation scenarios in the course of exercises and battles. The laser device (1) has a laser target illumination element which is designed for transmitting tightly bundled laser beams (11), as well as chopper means for transmitting laser beams which are not only coded, but also chopped at a predeterminable frequency. The sensors contain tuning means for obtaining an alternating electrical signal from the received chopped laser beams, which is supplied to a pre-amplifier connected upstream of a discriminator. A very sensitive laser identification system results due to the fact that the electrical signal obtained in this manner can be very strongly amplified.

6 Claims, 5 Drawing Sheets

LASER IDENTIFICATION SYSTEM

This application claims the benefit of U.S. Provisional Application Ser. No. 60/038,051, filed Feb. 18, 1997.

FIELD OF THE INVENTION

The invention relates to military identification systems, in particular identification systems operating with lasers, with at least one laser device for identifying at least one target device, wherein the laser device is designed to transmit a coded laser beam, and wherein the target device has sensor means for detecting this laser beam and converting it to electrical signals, which are provided to a discriminator, and also contains transmitting means for returning reports on the basis of decisions made in the discriminator to receiver means located inside or outside of the laser device.

BACKGROUND OF THE INVENTION

Events on the battlefield are becoming more and more complex and take place at increasing speed. It is necessary to make decisions in fractions of seconds, even though the consequences of errors are enormous. It is therefore necessary to convey relevant information to the decision makers succinctly and easily comprehensible in order to make rapid and error-free decisions possible. Among the most important information from the battlefield actually is the determination whether or not an object or a person is hostile.

Very advanced systems have been developed for the identification of aircraft and some other large devices capable of being used on the battlefield. Such systems are called IFF—(Identification-Friend or Foe) systems. But the problem of identifying individual soldiers taking part in the battle has up to now remained unsolved to a large degree, but is all the more pressing, since parties to a conflict can no longer be differentiated by the clothing of the soldiers and a clear definition of the front. It is therefore necessary to equip ground troops with systems which, prior to initiating an attack on a target, provide them with assurance regarding its identity.

A disadvantageous consequence of the increasing complexity of the technical systems employed on the battlefield is the increasing burdening of the individual soldier by the size and weight of the equipment which must be carried. For example, in some cases the weight of the equipment already has negative effects regarding the availability and flexibility of the individual soldier, so that an IFF-system should not be allowed to considerably increase the burden of the soldier with equipment. Since in modern concepts of fighting the soldiers often do not operate in larger groups, the IFF-system must make possible the identification not only of groups, but also of individual soldiers. In fact, the solitary soldiers, not distributed in groups on the battlefield, need the protection from the effects of the weapons of their own party the most.

Furthermore, combat events are conceivable today wherein individuals of many different cultures, languages and races fight as allies against a foe who is just as heterogeneous. Identification by means of appearance or language therefore contains high risks. Combat in modern war usually takes place at night and constitutes a considerable additional difficulty of identification by sight, furthermore, time also plays an important role. Therefore an IFF-system must provide the relevant information extremely rapidly. To be useful for ground troops, IFF-devices therefore must combine extreme sensitivity and accuracy as their properties and must be easy to carry or to transport.

In general, lasers emit a strongly collimated, quasi-monochromatic light beam. Semiconductor lasers made of various materials include a light spectrum extending from the ultraviolet to the infrared range in their emissions. Lasers available at this time are very dependable and become smaller and more efficient practically from one day to the next. For example, the semiconductor chip of a GaAs diode laser has extremely small dimensions, comparable with the size of a pinhead (without taking its power supply into consideration). Semiconductor lasers can be embodied to emit in pulses or continuously. With an appropriate power supply, modern gain-producing laser media make possible the generation of pulses of a length of a few nanoseconds by means of a laser embodied to emit continuously.

Semiconductor lasers emitting in the infrared range are ideally suited for applications in IFF-systems. Light beams emitted by infrared diode lasers cannot be detected by the unaided eye. Such light beams can only be detected by using special viewing aids, such as night-vision goggles.

Using an optical device which must be appropriately designed, the light emitted by an infrared laser diode can be collimated into a tightly bundled beam, which is ideally suited for illuminating point targets. Accordingly, collimated light beams from infrared laser diodes have a beam diameter of approximately 5 cm at a distance of 100 m, so that it is possible to illuminate practically every point target in a very accurately isolated manner. Furthermore, because of the narrow beam angle of the laser beam used, there is great security from countermeasures.

Laser diodes which presently are commercially available already have outstanding efficiency, more than 70% of the electrical output provided the semiconductor laser are converted into light output. Among other things, lasers have the exceptional quality of emitting light in the form of a single, narrow and almost diffraction-limited beam. In comparison with this, a 100 Watt light bulb may radiate a considerably greater light output than a comparatively low output laser, but the light radiated by the glowing wire is spatially and chronologically incoherent, because of which it has, on the one hand, a broad optical spectrum, but on the other hand it is radiated over a large spatial angle in spite of the relatively large surface of the glowing wire.

A high-quality lens can completely capture the light radiated by a laser and can focus nearly its entire optical output on an almost diffraction-limited spot of a diameter within an order of magnitude of a few millimeters. The optical power densities which can be achieved by focusing the light of a continuously emitting diode laser of moderate output with a light output of, for example 25 mW, are more than 50 kW/cm$^2$. The power density at an oxyacetylene flame can be cited for comparison, which is approximately 1 kW/cm$^2$.

An IFF-system requires a very good detection system. In this sense the basis for an IFF-system is an extremely sensitive detection system, which also operates dependably under difficult light conditions on open ground with bushes.

In order to be able to optimally detect the emission of the already described infrared laser, corresponding infrared detectors would be very important in a detection system for the IFF-system. So-called PIN photodiodes consist of a p- as well as an n-doped zone, both of which are separated by a zone of non-doped intrinsic material. Usually these photodiodes are designed in such a way that the major part of the incident radiation is absorbed in the non-doped intrinsic region, by means of which it is assured that all charged particles generated by the light are caught in the internal electrical field of the photodiode and add to the photoelectric current. Since the non-doped intrinsic zone separates the positive and negative volume charge, a PIN photodiode furthermore has a lesser capacitance in comparison with a PN photodiode, because of which the reaction time of a detection system becomes very short. A short reaction time is ideal in connection with IFF-systems based on the transmission of high rates of short pulses.

Because of their excellent stability in respect to environmental effects as well as their capability of being used over a wide range of temperatures, PIN photodiodes are suitable for use with IFF-systems employed in the open. A further important point for their application in connection with such systems is the minimal effects of sunlight on the detection system. Several manufactures produce photodiodes with special filters applied directly to the surface of the chip, which suppress undesired spectral ranges. These filters can be used to eliminate a large part of the light of the sun or other interfering sources existing in the vicinity, such as that of street lights or moving lights. The stability of modern PIN photodiodes over a long time assures that no measurable decrease of their sensitivity will occur over their lifetime.

Since pulsed lasers have inherent jitter (the period between two pulses is not constant), fluctuations of the pulse output (typically several percent), as well as large fluctuations in the pulse length (often around 50%), there are only limited possibilities for detection and achieving high sensitivity. Therefore the use of continuously emitting lasers is preferred for IFF-systems. As can be seen from the application entitled "Continuous Wave Laser Battlefield Simulation System" with U.S. Ser. No. 08/565,960, which is connected with this application and is cited as a reference here, permits the use of PPM (pulse position modulation) and PCM (pulse code modulation) as a method for coding "lock-in" and other detection methods for achieving high sensitivity. The light source emits a signal of a chronological progression, which is assured by the accuracy of quartz oscillators, wherein the receiver is also equipped with quartz oscillators of corresponding frequencies. Sensitivities, which cannot be achieved with pulsed lasers, are achieved by using continuously emitting lasers. In connection with the invention described here, these are in the range of nanoWatts. An extremely long effective range is made possible by means of this, and the realization of a system is permitted, which assures absolute safety even for unprotected eyes, and whose efficiency is not considerably diminished by leaves, fog and rain.

The already mentioned "Continuous Wave Laser Battlefield Simulation System" (SIMLAS) of applicant uses laser and light emitting diodes (LEDs) for simulating weapons including, but not limited to rifles, pistols, hand grenades, tanks and land mines. In every case the weapon is normally used by soldiers, and their effect is represented by a light beam as realistically as possible, be it that of a rifle or pistol projectile, an exploding hand grenade, etc. All participants in such an exercise (both persons and objects, such as tanks, aircraft, all-terrain vehicles, trucks, etc.) are equipped with detectors which register a possible effect of a weapon on the participant (for example a direct hit or near miss).

For example, the laser light source transmits a narrow infrared light beam, whose divergence is only 0.2 mrad. From this a beam diameter of only approximately 4 cm results after 100 m, because of which this laser can be used as an aiming aid together with night vision devices. However, the divergence can also lie between 0.1 and 5 mrad, or between 0.2 and 2 mrad, for example. Assembly and alignment of the laser can be made so permanently, that the system meets military standards in respect to shock resistance. The laser light beam being used with the SIMLAS is modulated by a code in such a way that both the acting person and the type of weapon used can be identified. By using signals in accordance with well-defined rules, all phases of training can be simulated by SIMLAS, including: a., registration of direct hits, near misses, injuries, putting out of action, etc., b., identification of troops and their status; c., registration of all events, including time and acting person; and d., compilation of all action-related data of individual persons or groups. To perform these tasks, continuously emitting laser diodes are used with SIMLAS. The light beam is coded in PCM and PPM, since these types of modulation combine great exactness with high sensitivity and immunity against interference signals and noise. The function of SIMLAS represents the technical basis of the IFF-system in accordance with the instant invention.

OBJECT AND SUMMARY OF THE INVENTION

It is therefore the object of the invention to create a laser identification system by means of which it is possible to avoid the disadvantages of the prior art in that a simple and secure data transmission between a laser device and a target device can be achieved.

In accordance with the instant invention, "friendly" troops carry a system device for illuminating a target in accordance with the invention, which is mounted on the weapon, and on their bodies they have a harness device with sensors, which in the sense of the invention is a part of the system device, which sensors meet detection tasks for various applications during any arbitrary simulation scenarios in exercises and battles.

The system device for illuminating the target transmits a modulated light beam to the sensors of the harness device of another soldier. The modulated light beam transmits information or a report in the form of a flexible protocol which, as a function of the required information, is coded as a data package of a length between 4 and 400 bits, for example, however preferably up to 200 bits. For example, the IFF-system can be based only on the transmission of preferably respectively 16 bits, while an IFF-system with a simulation option could require 44 bits. Depending on the number of bits to be transmitted, the code is sent within 5 to 70 ms. The sensor interprets the code, which is nominally divided into zones for identifying the individual soldier (16 bits), for identifying the weapon used (4 bits) and for transmitting the exact position (96 bits for all three coordinates determined by a GPS receiver). The bit code can then be used for the transmission of a highly encrypted code. The coded signal can consist of information for identifying: a., the individual soldier, b., a daily changing code, c., the battalion code, and d., the code of a synchronization with a mixture of a time-dependent and a special code. Therefore the communications system has a very wide information bandwidth and is extremely sensitive over a transmission distance of up to 11.3 km. The invention described here can preferably be used over short distances which approximately correspond to the visibility of an individual soldier, but in general it is also used for establishing contact with soldiers who are farther away than the distance mentioned.

DETAILED DESCRIPTION OF THE PREFERRED EMBODIMENTS

Figure 1:
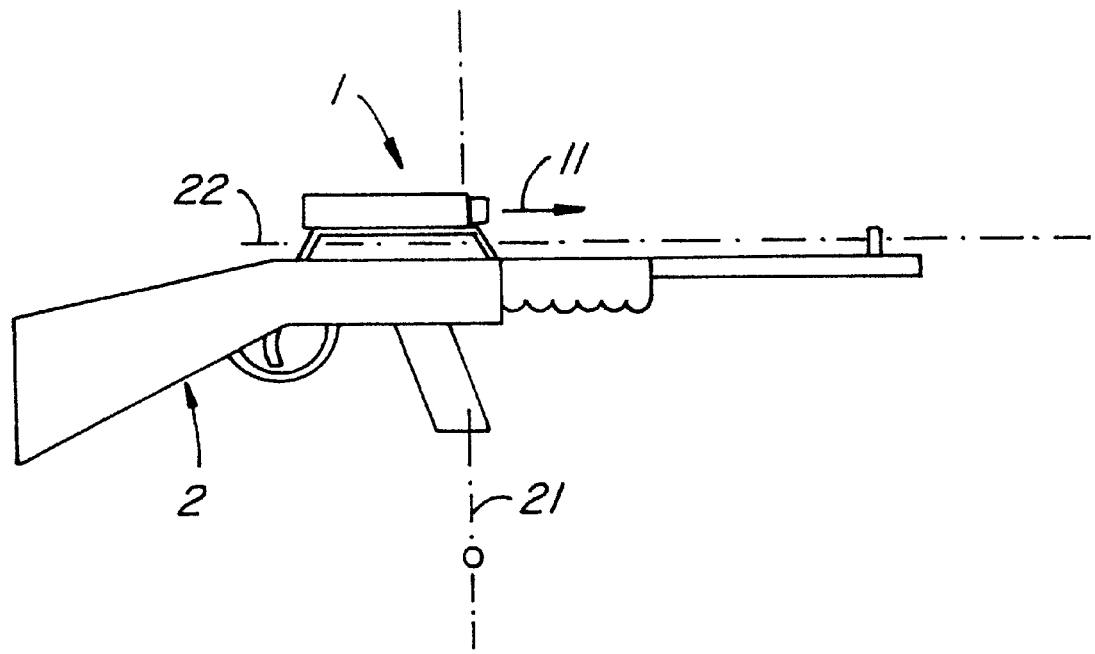
FIG. 1 represents a system device in accordance with the invention mounted on a weapon.

FIG. 1 shows how a recognition system device 1 in accordance with the invention is mounted on a weapon 2 in such a way, that the center of gravity line 21 of the weapon equipped with the laser device 1 intersects the laser device 1 itself. As can be seen from FIG. 2, the laser device 1 (FIG. 1) comprises a laser target illumination element 3, a housing element 4, in which the batteries required for operation are housed among other things, and a mounting rail 5 connecting elements 3 and 4 with each other. The elements 3 and 4 have cylindrical portions which extend parallel with each other in such a way that a soldier can aim between them along an aiming line 22 (FIG. 1). One front end of the element 3 has a display window 31 in the form of a miniature screen, used for representing pictograms of some useful pieces of information. The housing element 4 is provided with a luminous spot 41, a luminous zone 42, a fastening aid 43 for an antenna, two coaxial connectors 44, two operating knobs 45, 46 each, and a switch 47.

Figure 2:
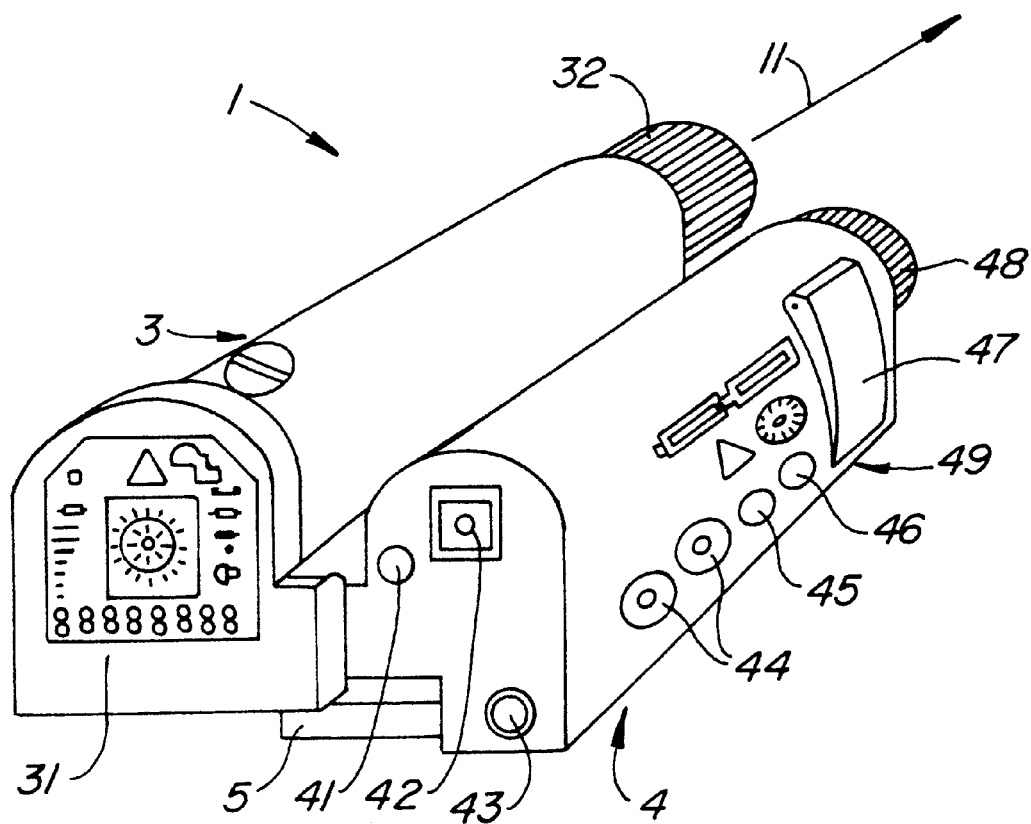
FIG. 2 shows the back of a system device in accordance with FIG. 1.
Figure 3:
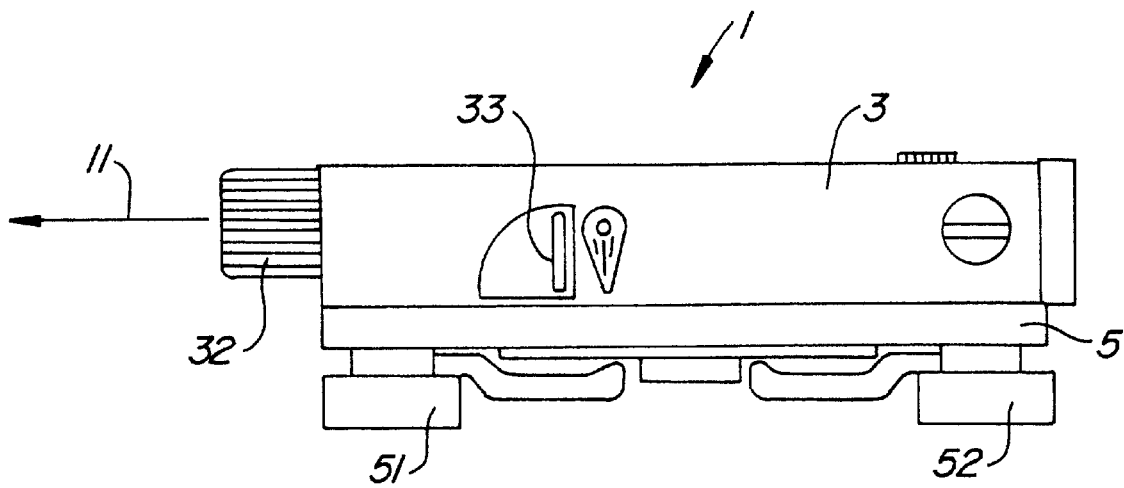
FIG. 3 shows a left lateral elevational view of the system device in accordance with FIG. 1.

FIGS. 2 and 3 show that the front portion of the element 3 has an optical laser device 32, which can transmit a laser beam 11. As represented in FIG. 3, the mounting rail 5 can be provided with widenings 51, 52 which make the mounting of the device I on the weapon 2 easier. A lateral lever 33 can be provided in the illumination element 3 for causing a change of the laser beam characteristic by the insertion of a small hologram plate in such a way that at the target the beam diameter is expanded in a ring shape or by points distributed in a ring shape.

Figure 4:
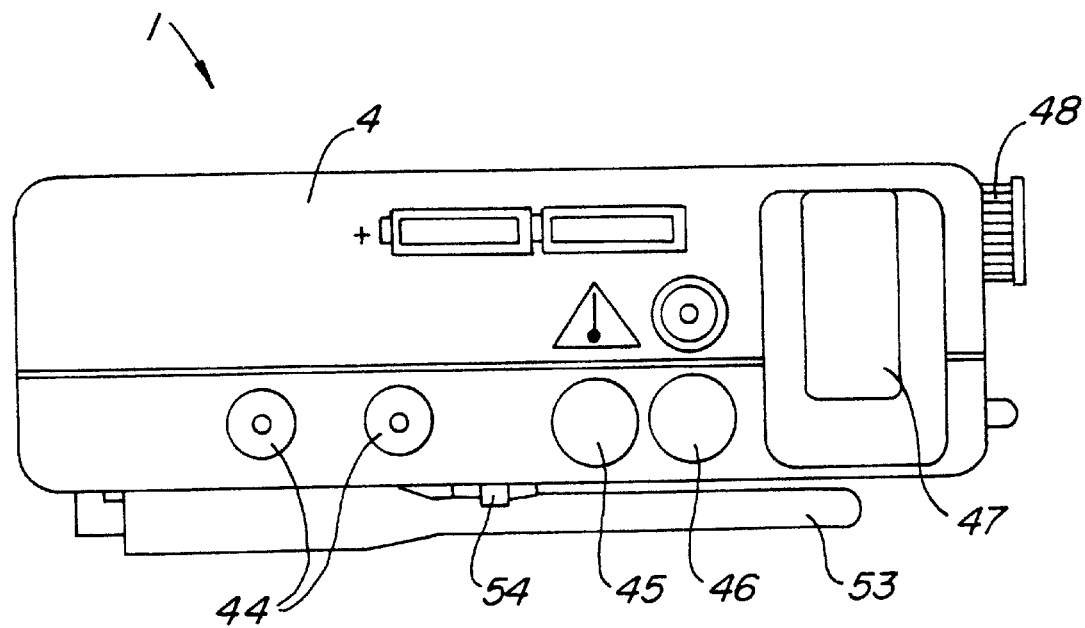
FIG. 4 shows a right lateral elevational view of the system device in accordance with FIG. 1.

FIG. 4 shows a housing element 4 with a pivotable rod antenna 53 and a snap-in or fixation device 54 for this antenna 53. An optical receiving device 48 can be provided at the front end of the housing element 4.

Figure 5:
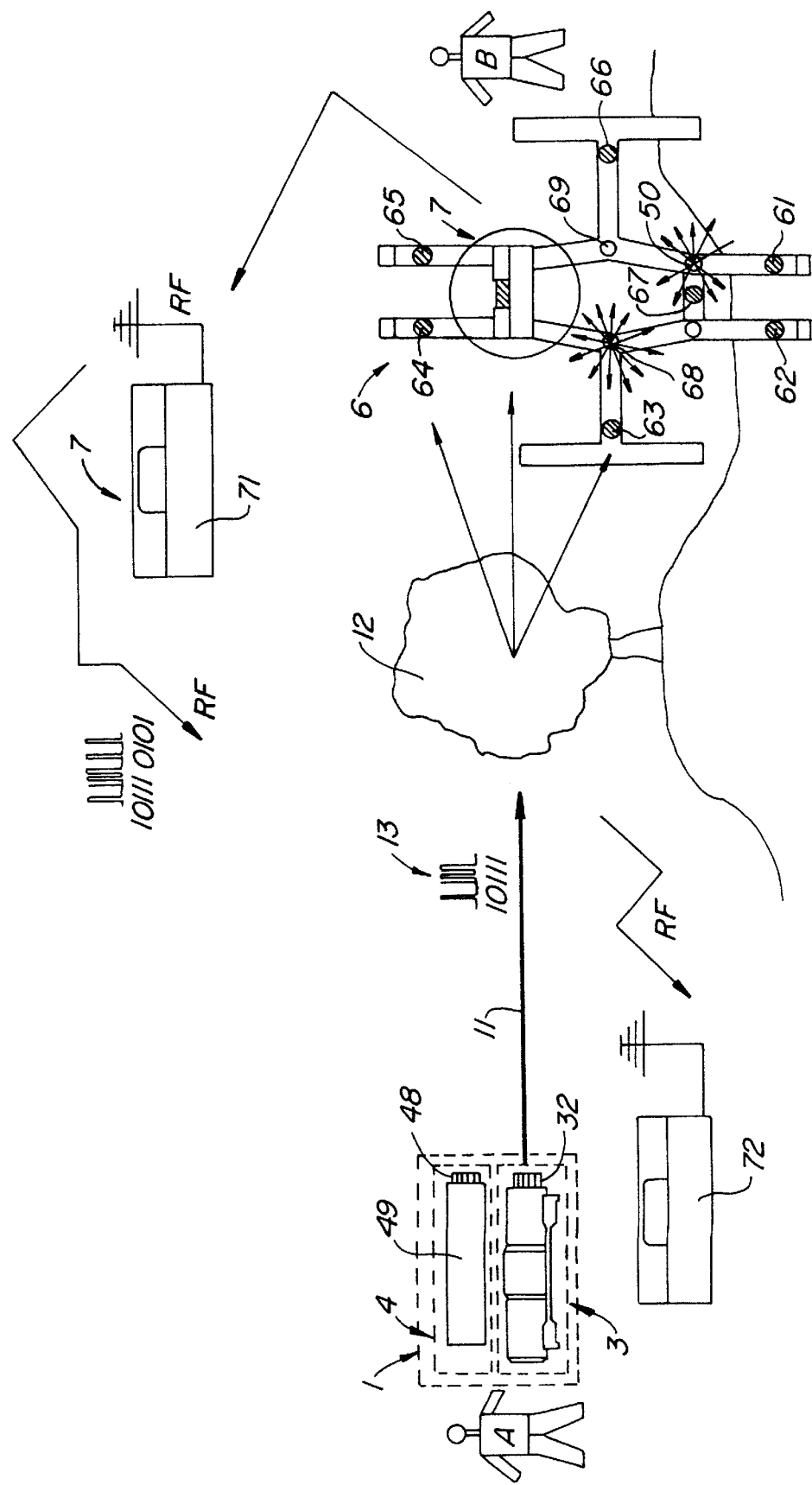
FIG. 5 shows a schematic representation for explaining the operation of a harness device equipped with sensors of the recognition system in accordance with the invention, in particular in case of a partially covered target.

FIG. 5 shows a harness device 6 provided as equipment for a soldier for battle purposes, having a plurality of electrical or electronic components. A harness device of this type is known, for example, from German Published, Non-Examined Patent Application DE-OS 40 03 960 A1. However, the harness device in accordance with FIG. 5 has sensors 61, 62, 63, 64, 65, 66, 67, which are preferably equipped with a special electronic circuit. In addition, this harness device supports one or several LED transmitters 68, 69, as well as a control unit 7, if required with a battery. In the example in FIG. 5 there is an obstacle, for example a bush 12, between the laser target illumination element 3 on the weapon of a first soldier A and the harness device of a second soldier B.

Figure 6:
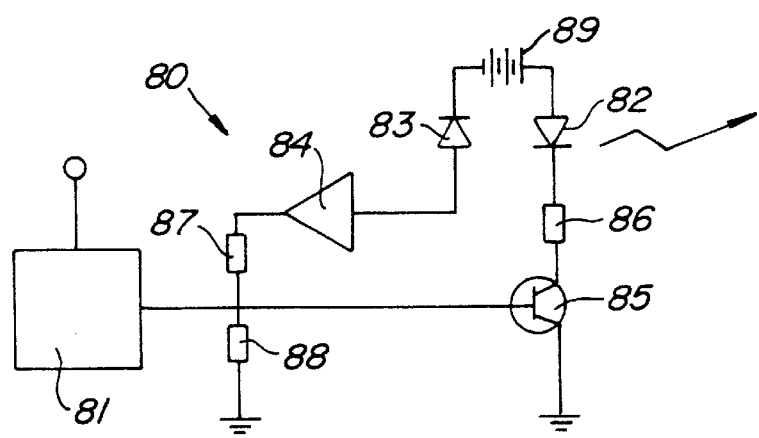
FIG. 6 shows a schematic representation of a preferred low-voltage laser, in particular for use in a laser target illumination element of the system device in accordance with the invention.

The low-voltage laser 80 in FIG. 6 is connected to a modulator 81 and comprises, for example, a laser diode 82, a feedback diode 83 coupled with it, an operational amplifier 84 and a transistor 85, as well as some resistors 86, 87 and 88. The anode of the diode 82 and the cathode of the diode 83 are together connected to a voltage source 89, for example a 3 to 5 Volt battery. The cathode of the diode 82 is connected to ground by means of the series connection of the resistor 86 and the emitter-collector path of the transistor 85. The amplifier 84 with the resistor 87, which is connected downstream of it, has been inserted between the anode of the diode 83 and the base of the transistor 85. The base of the transistor 85 formed by the modulating input of the circuit is connected to ground via the resistor 88. A reference potential can of course also be used as ground. The modulator comprises a circuit 81 which not only provides a coding function, but also a scrambling or chopper function in order to chop, already prior to coding, a light signal of the (carrier) frequency ft with a chopper frequency fz which takes place at a bit rate fd of the frequency.

Figure 7:
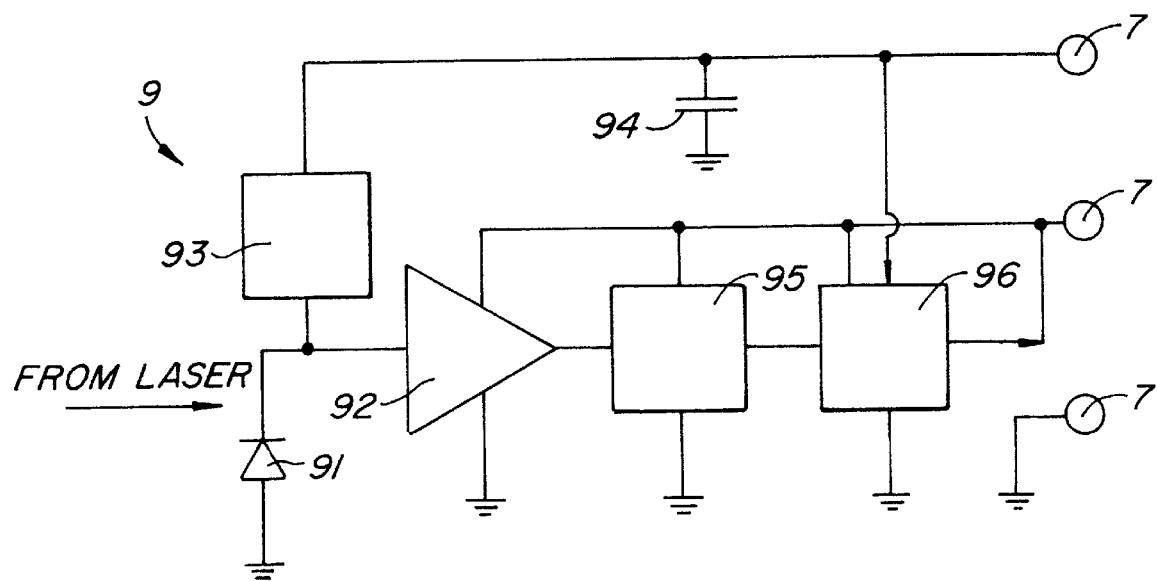
FIG. 7 represents a block wiring diagram of a sensor circuit for the sensors of such a harness device.

The sensors 61 to 67 in FIG. 6 contain a sensor circuit 9 in accordance with FIG. 7. For example, the sensor circuit 9 comprises a detector diode 91, whose cathode is connected on the one side with the input of the amplifier 92 and on the other side via a coil 93 with a connector of a capacitor 94. The output of the amplifier 92 is connected via an integrator filter 95 to a microprocessor 96, whose output signals are conducted via cables to the control unit 7.

The IFF-system in accordance with the instant invention operates under two different environmental conditions, depending on whether the soldier intended as the target is on the open ground or under cover. If, in a scenario with an open field, soldier A wants to identify soldier B, who is not under cover (this would be without the bush 12 in FIG. 5), he puts his laser illumination device 1 mounted on his weapon into operation and "fires" a laser beam 11 from the target illumination device 1 against soldier B. A coded message 13, transmitted by the laser beam 11, requests soldier B to identify himself. A harness device 6 of soldier B receives the coded message 13 from soldier A, which is composed, for example, of a signal comprising 116 bits. A sensor, for example 63, on the harness device 6 of soldier B recognizes the 116 bit signal. Now soldier B will receive the coordinates of soldier A obtained by means of GPS, and an LED transmitter 68 on the harness device 6 of soldier B transmits an acknowledgement code. The acknowledgement code can be arbitrarily selected by the unit employing the system. It can consist, for example, of the name of soldier B, the battalion or any arbitrary other terms.

In accordance with an embodiment of the invention, soldier A is not only equipped with a laser transmitter 3, but also has a laser receiver available, possibly housed in the element 4, with an optical receiving device 48 mounted parallel with the laser transmitter, i.e. on the element 3. The laser receiver now receives diffused light emitted by the LED transmitter 68 of soldier B. Soldier A sends an identification code until he receives an acknowledgement from soldier B. If soldier B is of his own party, soldier A sees a red alarm signal in the luminous spot 41 and/or in the luminous zone 42, which prohibits him from attacking soldier B. This alarm signal appears in the system in such a way that it can only be perceived by soldier A, but not by the enemy.

Although soldier A receives the acknowledgement signal for example by means of the optical receiving device 48 in the LED receiver 49 of his device 1, a corresponding target illumination device 3 of the laser device 1 of soldier B is not used as an infrared transmitter for returning the acknowledgement to soldier A, because the laser target illumination device 3 transmits a too tightly bundled light beam. This tightly, preferably at an angle of approximately 0.5 mrad, aligned light beam could not return the acknowledgement signal to soldier A, since soldier B does not necessarily know the position of soldier A. Therefore a high-output LED transmitter (LED=light-emitting diode) is used for returning the acknowledgement code, which is also attached to the harness device 6 of soldier B. This LED transmitter 50, 68 radiates its light output over a much larger spatial angle, so that the acknowledgement from soldier B can be received by soldier A under all circumstances. As long as soldier A can see soldier B, he is capable of receiving the acknowledgement signal.

Since fighting increasingly takes place under bad light conditions, it is becoming increasingly common to equip soldiers involved in the fighting with night-vision goggles. If this is the case, the weapon 2 is usually fired from the hip. The observation and aiming process takes place along the laser beam 11, which is visible by means of night-vision goggles (not represented). Because of the hip position of the weapon 2, the red alarm signal (41 and/or 42) is not visible to the soldier carrying the weapon 2. However, since the laser target illumination device 3 is controlled by a microprocessor, it is easily possible to alternatingly switch the laser beam 11 on and off in place of or in addition to the red alarm signal. The soldier equipped with the night-vision goggles can detect the alarm signal swiftly and easily by means of the laser beam and can in this way identify the illuminated soldier as belonging to his own party.

If the illuminated soldier is under cover, for example hidden behind a bush 12, soldier A can only partially see the body of soldier B. Again, soldier A fires the laser beam as described above. The harness device 6 of soldier B will still detect the laser beam from soldier A, because the total system has sufficient sensitivity for this mode of employment, for example because the sensors 61, 62, 64, . . . are each equipped with a special electronic device, which can be supplied with current by a common battery or, if desired, each by a single small battery. The main problem lies in that the LED transmitter 68 of soldier B can be completely screened by the bush 12 and that soldier A does not receive the response from soldier B. Only light coming directly from the LED transmitter 68 can be received by soldier A, since the light is radiated diffused and not directionally. If soldier A does not receive an acknowledgement within a time period Ta of, for example, 100 ms after the transmission of the laser beam, but soldier B would obviously be in a position to receive messages from soldier A, soldier B is given a second chance for transmitting an acknowledgement by transmitting a pulse sequence by means of a radio unit 71 attached to the harness device 6, which can comprise a radio transmitter or radio transmitter/receiver. This radio signal can be received by soldier A under any conceivable circumstances, but because of its vulnerability to enemy countermeasures it should be used only in case other means fail. Furthermore, because of transmitting such radio signals, enemy forces can cause friendly soldiers to be attacked. If soldier B is an enemy, no response to the interrogation transmitted by the laser beam of soldier A will take place in either of the above scenarios.

After a period of time Tb, the laser transmitter 3 of soldier A will stop operations, and a radio unit 72 installed in the system and provided with an antenna 53 will, as a precaution, transmit a pulse sequence Tc, lasting for example 1 ms, for identification interrogation. The time period Tb can for example lie between 1 ms and 1 s, but preferably should be 100 ms, and for this pulse sequence Tc can be selected to be approximately equal to or greater than 0.1 ms, preferably approximately 1 ms or more. The radio unit 72 can also comprise a radio transmitter or a radio transmitter/receiver. Under all conceivable circumstances this pulse sequence can be received over a distance of several kilometers. If after this second transmission over a radio channel there is no response, the system will identify the illuminated target as an enemy object. A total of 200 ms is required for this process. If soldier A wears night-vision goggles he will see the continuously transmitted laser beam, which identifies an illuminated soldier as an enemy, through the night-vision goggles.

The sensors 61, 62, 63, . . . are preferably designed in the form of round disks of a relatively great thickness, so that they are sensitive to laser beams not only on the surface, but also laterally, i. e. at the periphery of the disk. This means that the detector 91 (FIG. 7) is also distributed in a corresponding form over the cylindrical surface of the disks. As mentioned above, the laser beam is chopped, so that the detector 91 detects an intermittent radiation, which it converts with the aid of the resonance circuit formed by the coil 93 and the capacitor 94 into an alternating current of the same frequency fz. The alternating voltage resulting therefrom at the input of the amplifier 92 is very strongly amplified by the latter. The output signal of the amplifier 92 is conducted to the integrator filter 95, which transmits the coded signal to the microprocessor 96 for evaluation. Signals evaluated from this are then supplied to the control unit 7 by the microprocessor 96. For example, the pulse width of the transmitted chopped laser pulses lies between 10 ns and 100 ms, and preferably between 0.1 and 10 ms. The width of an information bit pulse preferably matches the width of a number of 3 to 50 chopped laser pulses.

In accordance with another embodiment of the invention, a lever, not represented, can be used for triggering the laser device in place of one of the operating knobs 45 or 46.

The upper part of the laser device preferably forms two semi-cylindrical parallel chambers, wherein the gap provided between these chamber permits an unimpeded view of the target. Since this gap is sufficiently wide, in a further embodiment of the invention a luminous spot can be housed just laterally next to this gap, namely preferably in the end area of the gap where the light beam is radiated in such a way that the soldier can simultaneously see the target and this luminous spot. The laser device preferably emits light in a wavelength in the range between 780 and 905 nm, for example 820 nm, and this namely at an output strength of an order of magnitude of 50 mW. If this laser light source is operated with the holographic grid, because of which the exiting light beam can have a divergence of 10 mrad, for example, the range is approximately 2 km. Without the holographic grid, because of the reduced divergence of 0.2 mrad, however, it is more than 10 km. At distances of less than 2 km the aiming process is made easier by the inserted holographic grid.

Figure 8:
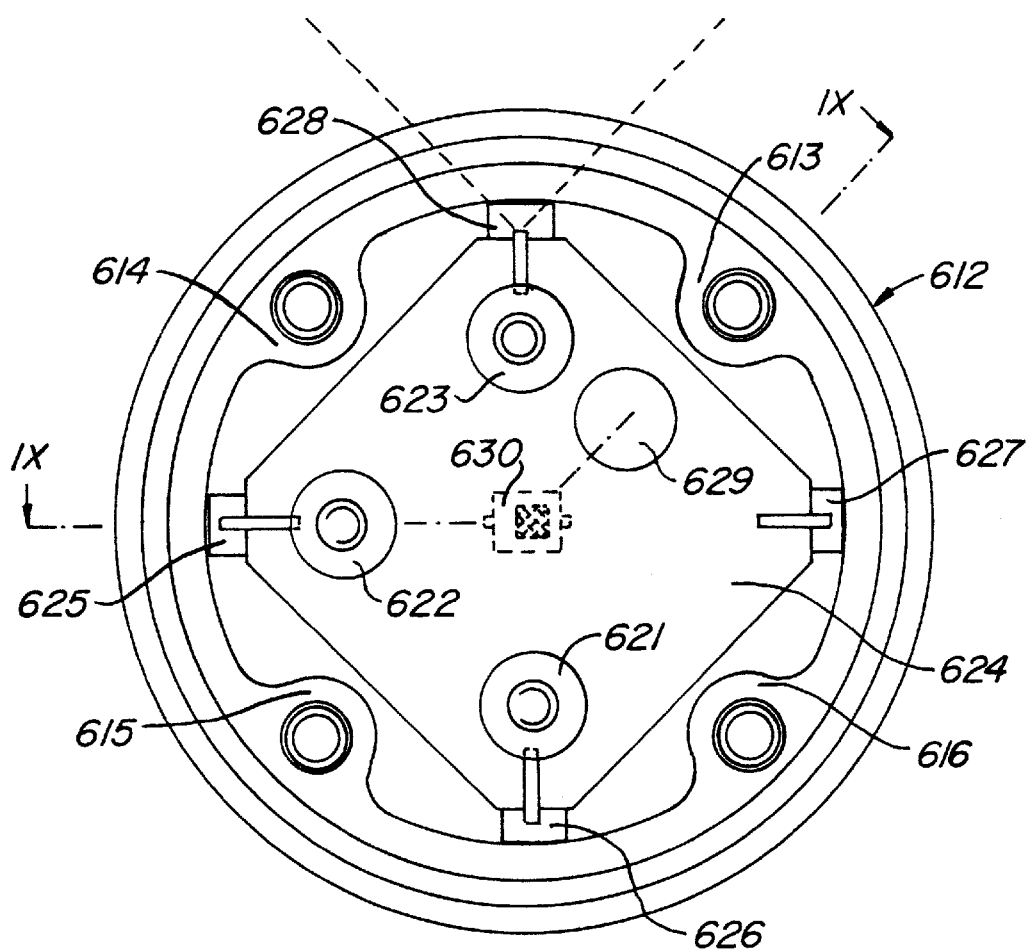
FIG. 8 shows the interior area of a capsule-shaped housing of a sensor.
Figure 9:
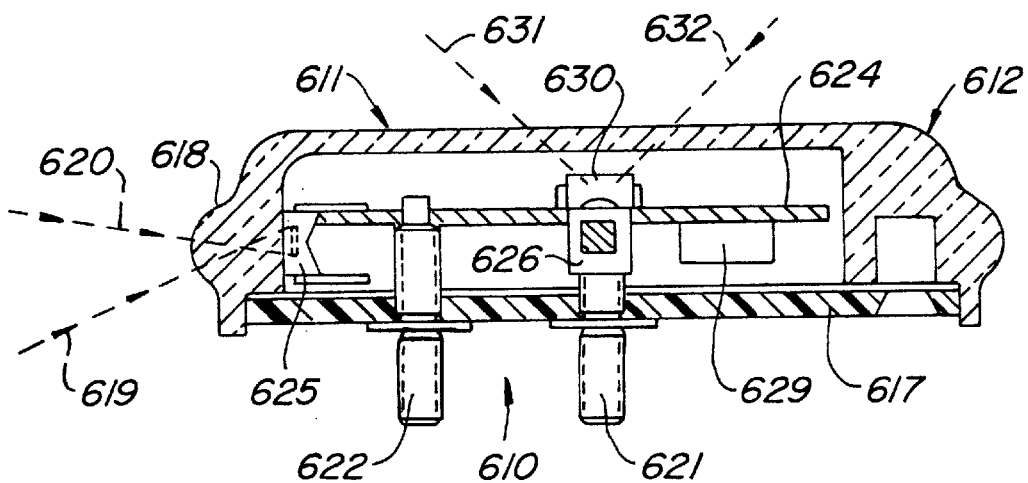
FIG. 9 represents a section along the line IX—IX in FIG. 8.

FIG. 8 shows the interior area of a capsule-shaped housing 610 of a sensor 61, 62, 63, (FIG. 5), and FIG. 9 a section along the line IX—IX in FIG. 8. The housing 610 has a bottom 611, preferably embodied flat, and a ring-shaped wall 612. The housing 610 has four enlargements 613, 614, 615 and 616 in its interior (FIG. 8), with threaded bores for fastening a plate 617, which can be designed as a printed circuit board. Toward the outside, the housing 610 is provided with a peripheral bulge 618, which acts in the manner of a toroidal magnifying glass or collecting lens for the incident laser beams 619, 620, because the housing material is transparent to or respectively light-conductive for the laser radiation used. Preferably three fastening elements 621, 622, 623 are arranged on the plate 617, which extend far into the interior area of the housing and there maintain a printed circuit board 624 in place, which supports several photo-sensors 625, 626, 627, 628 and a microprocessor 629 or, if desired, only a discriminator. The fastening elements 621, 622, 623 can be simultaneously used as electrical connectors for conducting the already discriminated signals via lines to the control unit 7 (FIG. 5).

The photo-sensors 625, 626, . . . are arranged inside the housing in such a way that their sensitive sides respectively rest flat against the inner, preferably cylindrical, ring-shaped wall portions located between the enlargements 613, 614, 615 and 616, in order to be able to detect the received laser beams conducted through the bulge. At least one further photo-sensor 630 is located in the center of the printed circuit board 624, whose sensitive side is oriented toward the bottom 611 of the housing and is therefore suitable for detecting laser beams 631, 632, whose incidence is at a greater inclination in respect to the surface of the bottom 611 than the laser beams 620 and 619, which are propagated almost parallel in respect to this bottom surface.

In addition to the individual microprocessor 629 or 96 (FIG. 7) or discriminator, preferably an individual pre-amplifier 92 and an integrator filter 95 are also housed in the housing 610 in order to obtain as individual means an alternating electrical signal from the received chopped laser beams and to send the already discriminated signals via lines to the control unit 7. It is possible, for example, to house the coil 93 and/or the capacitor 94 in the printed circuit board 624 or to integrate them there, which, as sensor means, form the resonance circuit. The discriminator and/or the microprocessor can be embodied for only filtering signals with an expected coding out of a received laser radiation.

Accordingly, the sensors in FIGS. 8 and 9 are embodied as round disks with the diameter/thickness ratio shown in the drawings figures. The incident laser beams can be reflected by the body of soldier B and can laterally reach the radiation sensitive side of the photo-sensor 625 through the peripheral bulge 618, for example as laser beams 619 or 620 (FIG. 9). When employing infrared laser radiation, which is invisible to the human eye, the housing 610 can be impervious to normal light, for example colored or black.

The above explained exemplary embodiments are to be merely understood to be representations for the employment of such a system, which can also be used for simulation purposes. However, other embodiments immediately resulting from them for one skilled in the art also contain the basic concept of the invention.

What is claimed is:

1. A laser identification system comprising at least one laser device for identifying at least one target device, wherein said laser device is designed to transmit a coded laser beam, and wherein said target device has sensor means for detecting this laser beam and converting it to electrical signals, which are provided to a discriminator, and said target device also contains transmitting means for returning reports on the basis of decisions made in the discriminator to receiver means located inside or outside of the laser device, said laser device being designed for emitting a tightly bundled laser beam and containing chopper means for emitting a laser beam which is not only encoded, but also chopped at a predeterminable frequency, the sensor means of the target device contain means for obtaining an alternating electrical system from the received chopped laser beams, which is supplied to a pre-amplifier connected upstream of the discriminator, wherein the transmitting means of the target device are designed for transmitting a laser radiation over a wide spatial angle and have further chopping means of transmitting a laser beam which is not only coded, but also chopped at a predeterminable frequency, and wherein the laser device includes a further discriminator as well as sensor means for obtaining an alternating electrical signal from the received chopped laser beams, which is supplied to a further pre-amplifier connected upstream of this discriminator.

2. A laser identification system in accordance with claim 1, wherein the laser device and the target device each have a microprocessor and a radio unit such that, if the laser device has not received a return signal from the target device within a period of time following the transmission of a bundled coded laser beam, it transmits a further laser beam with a different coding which causes the radio unit of the target device to transmit an acknowledgment which can be received by the radio unit of the laser device.

3. A laser identification system in accordance with claim 2, wherein if the laser does not receive an acknowledgment from the target device within a period of time following the transmission of a bundled laser beam with a second coding, it transmits a report by means of its own radio unit, expecting an acknowledgment from the target device via radio.

4. A laser identification system in accordance with claim 1, wherein the target device is a portable harness device with sensor means, which includes tuning means for obtaining an alternating electrical signal from the chopped laser beams, which is supplied to a pre-amplifier connected upstream of a discriminator, and the sensor includes a capsule-shaped housing with a bottom and a ring-shaped wall, the housing is made at least partially from a material which is transparent to the laser beam or is light-conducting and is provided with a peripheral bulge, which acts in the manner of a collecting lens for the incident laser beams, and photo-sensors are arranged in the interior of the housing in such a way that their sides sensitive to laser beams respectively rest against the interior wall portion of the housing in order to be able to detect there a laser beam conducted through the bulge.

5. A laser identification system in accordance with claim 4, wherein besides individual means for obtaining an alternating electrical signal from the received chopped laser beams, an individual pre-amplifier and a discriminator are also placed in this housing in such a way that already discriminated signals are supplied via lines to a control unit.

6. A laser identification system in accordance with claim 4 wherein the interior wall portion of the housing is cylindrical and ring-shaped.

* * * * *